United States Patent

[11] 3,555,173

[72] Inventor Robert C. Wheeler
Batavia, N.Y.

[21] Appl. No. 4,165
[22] Filed Jan. 15, 1970
[45] Patented Jan. 12, 1971
[73] Assignee Sylvania Electric Products Inc.
a corporation of Delaware
Continuation of application Ser. No. 618,522, Feb. 24, 1967, now abandoned.

[54] COLOR KILLER CIRCUIT FOR TELEVISION RECEIVERS
8 Claims, 3 Drawing Figs.

[52] U.S. Cl. ........ 178/5.4
[51] Int. Cl. ........ H04n 9/48
[50] Field of Search ........ 178/5.4, 5.4CK, 5.4ACC

[56] References Cited
UNITED STATES PATENTS
2,736,765 2/1956 Lohman et al.
3,272,915 9/1966 Theriault.
3,287,494 11/1966 Spies et al.

*Primary Examiner*—Richard Murray
*Attorneys*—Norman J. O'Malley, Robert E. Strausser and Cyril A. Krenzer

ABSTRACT: A solid state color killer circuit which functions as a switching circuit to control a direct current potential which is applied to a stage in the chrominance channel to disable the chrominance channel when monochrome signals are received. When color signals are received, the color killer circuit shunts the direct current potential away from the chrominance channel to permit normal color signal processing. The circuit is adapted to provide a visual indication of the presence or absence of color signals.

PATENTED JAN 12 1971 3,555,173

INVENTOR.
ROBERT C. WHEELER

BY Robert E. Strauser
ATTORNEY

COLOR KILLER CIRCUIT FOR TELEVISION RECEIVERS

This is a continuation of application Ser. No. 618,522, filed Feb. 24, 1967, and now abandoned.

BACKGROUND OF THE INVENTION

This invention relates generally to television receivers capable of receiving both color and monochrome broadcast signals, and more particularly to improved circuitry operative in response to the broadcast signal to adapt the receiver for either color or monochrome image reproduction.

Under the standards presently adopted in the United States, color television receivers must be capable of receiving and reproducing monochrome broadcasts as well as receiving and reproducing color broadcasts. The composite color signal includes a chrominance component and a luminance component, the latter being comparable to a monochrome signal representing the brightness variations of the image. The chrominance component consists of a subcarrier wave and its modulation sidebands modulated in phase to represent hue and in amplitude to represent color intensity. In addition, the composite color signal contains horizontal and vertical synchronizing pulses, and synchronizing bursts of the color subcarrier. In transmission the color subcarrier is suppressed, making it necessary to reproduce the subcarrier at the receiver to permit demodulation of the chrominance components. Therefore, the synchronizing bursts of the color subcarrier are utilized to control a subcarrier oscillator in the receiver operative to provide the desired continuous wave signal for subcarrier reinsertion.

In a color television receiver, after amplification and detection of the composite color signal, the luminance and chrominance components are separated and applied to luminance and chrominance channels, respectively, of the receiver for further signal processing. The synchronizing bursts of the color subcarrier are also applied to the chrominance section of the receiver.

This configuration renders the color television receiver capable of reproducing either monomchrome or color signal broadcasts. For a color broadcast, the luminance and chrominance signals are processed through their respective channels and recombined at the picture tube to produce the color image. For a monochrome broadcast, the monochrome signal is processed in normal fashion through the luminance channel of the receiver and is applied to the picture tube to recreate the black and white image. However, in the absence of a color signal, it is necessary to disable the chrominance channel to avoid spurious color in the picture. This function is accomplished using color killer circuitry which is operative in response to an absence of color signals to cut off one of the stages of the chrominance channel.

Under optimum operating conditions, the color killer functions as an on/off switch; that is, the chrominance channel is completely disabled when no color signal is received and is fully operative when a color signal is present. To accomplish this function properly, the circuit should have relatively sharp switching characteristics. Generally, prior art vacuum tube color killer circuits do not have the desired switching characteristics with the result that weak signal color performance is severely degraded. Under such conditions the color killer operation becomes sparodic often producing the effect of the so-called colored "snow" in the picture. Efforts to provide transistorized color killer circuits having improved switching characteristics have been partially successful, but require additional circuitry, thereby adversely affecting the receiver cost.

In some instances, particularly when a weak color signal is received, it is often difficult to tell by viewing the reproduced image whether a monochrome or color signal broadcast is being received. It would therefore be desirable to have an indicator responsive to the received signal and operative to indicate the presence or absence of color in the broadcast signal.

Accordingly, it is an object of this invention to provide improved color killer circuitry for color television receivers which overcomes the above-noted difficulties.

Another object of this invention is to provide improved color killer circuitry of reliable, economic design utilizing solid state semiconductor components.

A further object of this invention is to provide an improved color killer circuit having the additional capability of indicating the presence or absence of color in the received broadcast signal.

SUMMARY OF THE INVENTION

According to one aspect of the invention, the color killer circuit comprises a transistor amplifier which is operative to control a bias voltage applied to a stage in the chrominance channel. When no color signal is present, the transistor is nonconducting and the bias voltage applied to the chrominance channel operates to cut off the chrominance channel. If color signals are present, the color killer transistor amplifier is rendered conducting, removing the bias voltage from the chrominance channel stage and color signals are processed in normal fashion through the chrominance channel. A visual indicating device in the color killer circuit is operative in response to the conduction or nonconduction of the transistor amplifier to provide a visual indication when color signals are present.

DESCRIPTION OF THE PREFERRED EMBODIMENTS

For a better understanding of the present invention, together with other and further objects, advantages and capabilities thereof, reference is made to the following disclosure and appended claims in connection with the above-described drawing.

Figures 1, 2:
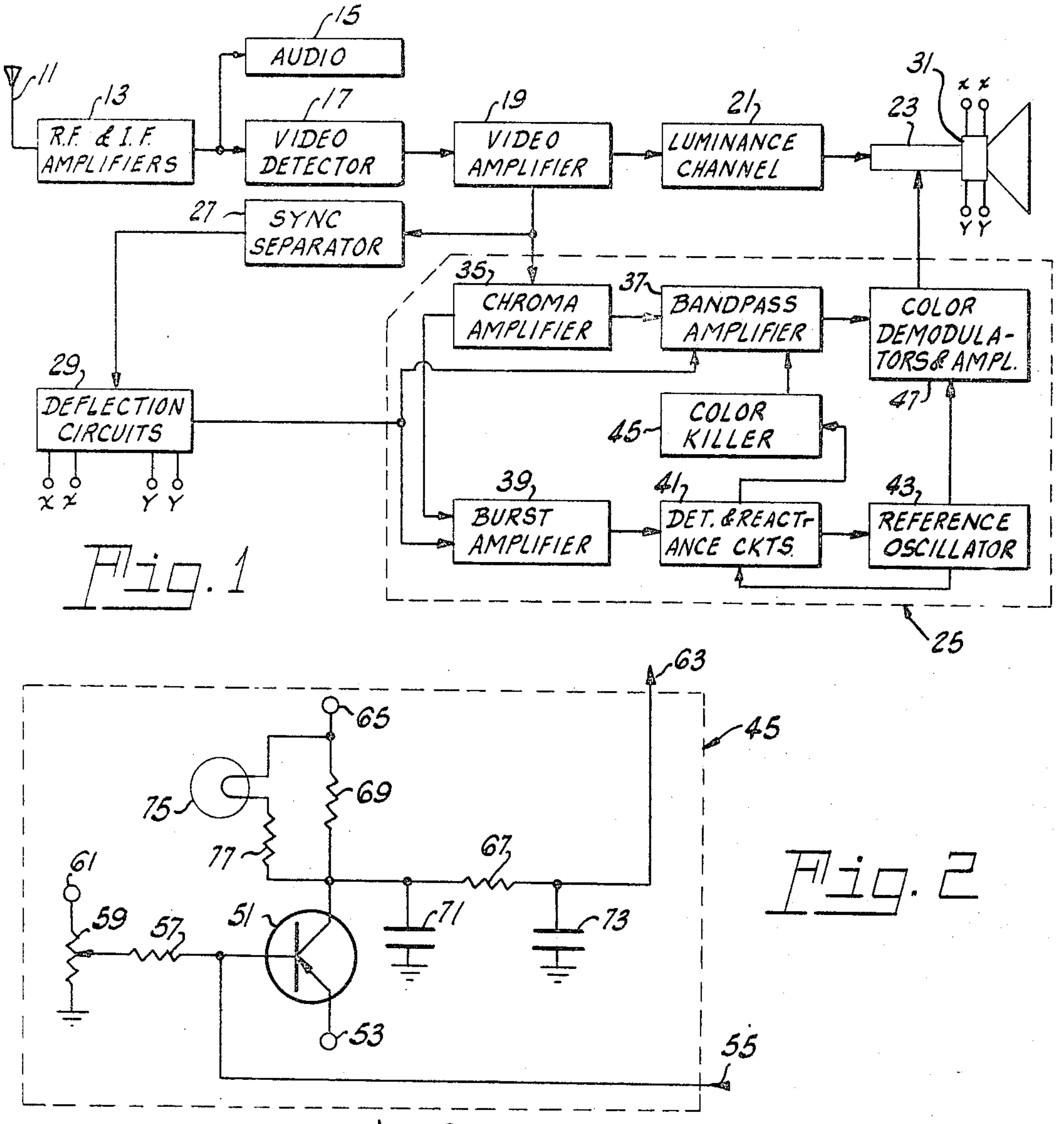
FIG. 1 is a block diagram of a television receiver embodying the present invention and capable of receiving either color or monochrome signal broadcasts.
FIG. 2 is a schematic circuit diagram of a color killer circuit according to the present invention.

Referring first to the block diagram of FIG. 1, the composite color signal received at the antenna 11 is applied to the RF, IF amplifier circuitry 13. At the output of the IF amplifier, the audio signal components are applied to the audio channel 15 and the video components, after detection by the video detector 17, are applied to a video amplifier 19. In the video amplifier the luminance components are separated from the composite video signal and are coupled to the luminance channel 21, the output of which is applied to the cathode ray tube 23. The remaining components of the composite video signal are applied to the chrominance channel 25 and a sync separator circuit 27. The sync circuitry separates the deflection synchronizing pulses from the other signal components and applies these pulses to suitable deflection circuitry 29. The deflection circuitry develops the horizontal and vertical deflection signals, X and Y, which are applied to the deflection yoke 31 mounted on the cathode ray tube 23 to accomplish the necessary scanning function.

The input to the chrominance channel 25 includes the chrominance signal components and the subcarrier color burst synchronizing signal, which are applied to the input of a chroma amplifier. After amplification in the chroma amplifier, the signals are applied to a band-pass amplifier 37 and a burst amplifier 39. The burst amplifier selectively amplifies the subcarrier color burst signal which is then applied to the detector and reactance circuits 41. The detector and reactance circuits operate in conjunction with a reference oscillator 43 to keep the reference oscillator locked in phase with the subcarrier color burst signal. In addition, the detector circuits 41 develop direct current voltages, the magnitude of which are determined by the presence or absence of the subcarrier color burst signal, and these DC voltages are applied to the input of the color killer circuit 45.

The output from the band-pass amplifier 37 contains only the chrominance signal components which are coupled to the color demodulator circuitry 47, which also receives a signal input from the reference oscillator 43. The demodulator circuits develop the appropriate color signals which are suitably applied to the picture tube 23 to permit reproduction of the color image. The output of the color killer circuit 45 is applied to the band-pass amplifier 37 and operates to cut off the band-pass amplifier when no color signals are present.

Referring next to FIG. 2, a color killer circuit 45 includes a transistor 51 connected in a common emitter configuration with the emitter electrode connected to a source of reference potential as represented by the terminal 53. An input terminal 55 adapted to receive a signal output from the detector and reactance circuits 41 is connected directly to the base electrode of the transistor 51. A resistor 57 is connected between the base electrode and the center tap of a potentiometer 59, which is placed between a source of bias potential as represented by the terminal 61 and ground. An output terminal 63 adapted to apply control voltages to the band-pass amplifier 37 is connected via a resistor 67 to the collector electrode of the transistor 51. A source of energizing potential as represented by the terminal 65 is applied to the collector electrode of the transistor 51 via a resistor 69. A capacitor 71 may be connected between the collector electrode and ground, and a second capacitor 73 may be connected between the output terminal 63 and ground. The visual indicating device, here illustrated as a lamp 75 in series with a resistor 77 is connected between the source of energizing potential 65 and the collector electrode of the transistor 51.

In operation, the color killer circuit 45 functions as an on/off switch in the desired fashion. When a monochrome signal is present, the bias potentiometer 59 is adjusted such that the transistor 51 is just nonconducting. This condition generally corresponds to zero volts input at terminal 55 from the detector circuits 41. With the transistor 51 cut off, the negative voltage from the negative source of energizing potential 65 is applied to the output terminal 63 and hence to the band-pass amplifier 37 to cut off this stage in the chrominance channel 25, thereby preventing random noise pulses from generating spurious color effects in the reproduced monochrome picture. Also, since there is essentially no current flow through the lamp 75 of the visual indicating device, the lamp is not lighted during the reception of monochrome broadcast signals.

Under conditions where color signals are present, the voltage output from the detector circuit 41 becomes negative, which forward biases the base to emitter junction of the transistor 51 and the transistor conducts in saturation. This causes the transistor collector voltage to approach the voltage potential at the emitter electrode, which may be ground or a small positive voltage. This in turn, allows the previously cutoff stage in the band-pass amplifier 37 to conduct and further process the color signals for display on the cathode ray tube 23. In addition, current through the lamp 75 causes it to light providing a visual indication of the presence of the color broadcast signal.

The $\pi$ filter consisting of capacitors 71 and 73, and the resistor 67 connected between the output terminal 63 and the collector electrode of the transistor 51 acts primarily to filter out any ripple or noise which might emanate from the negative supply 65. In addition this filter also diverts any noise pulses which might occur in the input 55 from the detector circuitry 41. In some instances where noise is not a problem, or where filtering action is provided at the input of the band-pass amplifier 31, the $\pi$ filter may be deleted from the circuit without adversely affecting circuit operation.

Figure 3:
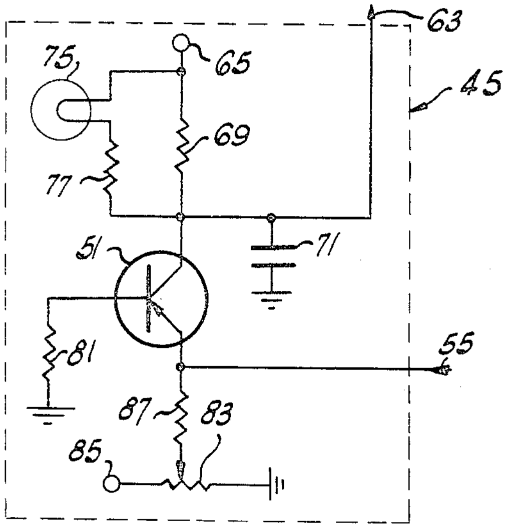
FIG. 3 is a schematic circuit diagram of an alternate embodiment of a color killer circuit according to the invention.

In an alternate embodiment of the invention shown in FIG. 3, the transistor 51 is connected in a common base configuration, with the base electrode connected to ground via a resistor 81. A potentiometer 83 is connected between a source of bias potential as represented by the terminal 85 and ground. The emitter electrode of the transistor 51 is connected directly to the input terminal 55 and is connected via a resistor 87 to the center-tap of the potentiometer 83. The collector portion of the circuit of FIG. 3 is essentially the same as that of FIG. 2 except that the resistor 67 and the capacitor 73 have been removed and the collector electrode is connected directly to the output terminal 63.

The circuit of FIG. 3 is designed for use where the output of the detector 41 (input terminal 55) is approximately 0 volts for monochrome signals and becomes positive when color signals are received. The potentiometer is adjusted so that the transistor 51 is nonconducting when a monochrome signal is received, the base to emitter junction being reverse biased. Under this condition the negative voltage from the source 65 is applied to the output terminal 63 and operates to cut off the band-pass amplifier 37. When a color signal is received, the emitter electrode of the transistor becomes positive, forward-ing biasing the base to emitter junction and the transistor goes into conduction, rapidly approaching saturation. Therefore, the collector potential approaches that of the emitter, thereby removing the cutoff voltage from output terminal 63 and the control electrode of the band-pass amplifier. The band-pass amplifier then performs in normal fashion, suitably amplifying the received color signals which are subsequently applied to the cathode ray tube 23 to effect color image reproduction. The current through the lamp again causes the lamp 75 to light and indicate the presence of a color broadcast.

It will be recognized that the foregoing embodiments of the invention may be modified to suit particular system requirements or design preferences. For example, if the circuit is to be used in a system which requires a positive potential to cut off a stage in the chrominance channel, the circuit may be modified by substituting an NPN transistor for the PNP transistor 51 and appropriately changing the polarities of the energizing and biasing potentials. While the invention has been illustrated as controlling the band-pass amplifier 37 in a particular receiver system configuration, it may be used to control any stage in the chrominance channel; such as, the chroma amplifier, the demodulator amplifiers, or the color difference amplifiers.

It is therefore apparent that Applicant has provided improved and simplified color killer circuitry having sharper switching characteristics and improved sensitivity. Since the present invention utilizes a direct current potential, rather than rectified pulses, for a control voltage source, the circuit is less susceptible to noise pulses and is able to provide sufficient power to accomplish the control function without requiring additional amplification. Further, the invention is adapted to providing a visual indication of the presence or absence of color signals in the received broadcast.

While there have been shown and described what are at present considered the preferred embodiments of the invention, it will be obvious to those skilled in the art that various other changes and modifications may be made therein without departing from the scope of the invention as defined by the appended claims.

I claim:

1. In a television receiver for receiving color and monochrome signal broadcasts and including a luminance channel and a chrominance channel with the chrominance channel having a chrominance amplifier and a detector means which provides a signal output below a predetermined level when color signals are received and above a predetermined level when monochrome signals are received, a color killer circuit comprising in combination:

a semiconductor device coupled to a potential reference level;

biasing means coupled to said semiconductor device;

output terminal means coupling said chrominance amplifier to said semiconductor device;

DC potential source coupled to said semiconductor device and to said output terminal means; and input terminal means coupling signals from said detector means to said semiconductor device, said signals causing conduction and non-conduction of said semiconductor device and application of said DC potential to said chrominance amplifier to effect disablement and enablement thereof in accordance with received monochrome and color signals.

2. The combination of claim 1 wherein said chrominance channel includes a demodulator and amplifier means and said output terminal means couples said demodulator and amplifier means to said semiconductor device with said DC potential applied to said demodulator and amplifier means.

3. The combination of claim 1 wherein said chrominance channel includes a band-pass amplifier and said output terminal means couples said band-pass amplifier to said semiconductor device with said DC potential applied to said band-pass amplifier.

4. The combination of claim 1 wherein said semiconductor device includes an input electrode coupled to a potential reference level, a control electrode coupled to said biasing means and said input terminal means, and an output electrode coupled to said output terminal means and said DC potential source.

5. The combination of claim 1 wherein said output terminal means includes a resistor coupling said chrominance amplifier to said semiconductor device.

6. The combination of claim 1 wherein said output terminal means includes at least one capacitor coupling said means to a potential reference level.

7. The combination of claim 1 including a visual indicating device coupled intermediate said DC potential source and said semiconductor device and output terminal means.

8. The combination of claim 7 including a first resistor in series connection with said visual indicating device and a second resistor shunting said series connected first resistor and visual indicating device.